United States Patent
Hagiwara (10) Patent No.: US 8,228,396 B2
(45) Date of Patent: Jul. 24, 2012

(54) IMAGE PROCESSING APPARATUS, IMAGE CAPTURING APPARATUS, AND IMAGE DISTORTION CORRECTION METHOD

(75) Inventor: Soichi Hagiwara, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 274 days.

(21) Appl. No.: 12/612,150

(22) Filed: Nov. 4, 2009

(65) Prior Publication Data
US 2010/0097502 A1    Apr. 22, 2010

Related U.S. Application Data

(63) Continuation of application No. PCT/JP2007/059571, filed on May 9, 2007.

(51) Int. Cl.
*H04N 5/225* (2006.01)
*G06K 9/40* (2006.01)

(52) U.S. Cl. ........................... 348/222.1; 382/275

(58) Field of Classification Search ............... 348/222.1, 348/335; 382/275
See application file for complete search history.

(56) References Cited

U.S. PATENT DOCUMENTS

| | | | |
|---|---|---|---|
| 2004/0001152 A1* | 1/2004 | Funamoto | 348/222.1 |
| 2004/0156558 A1* | 8/2004 | Kim | 382/276 |
| 2005/0053307 A1* | 3/2005 | Nose et al. | 382/275 |
| 2005/0174437 A1* | 8/2005 | Iga | 348/222.1 |
| 2005/0213847 A1* | 9/2005 | Takane | 382/275 |
| 2006/0110050 A1* | 5/2006 | Aoyama et al. | 382/232 |
| 2006/0188172 A1 | 8/2006 | Higurashi et al. | |
| 2007/0115384 A1* | 5/2007 | Furukawa | 348/335 |
| 2007/0236595 A1* | 10/2007 | Pan et al. | 348/335 |

FOREIGN PATENT DOCUMENTS

| | | |
|---|---|---|
| EP | 1 650 705 A1 | 4/2006 |
| JP | 05-48051 U | 6/1993 |
| JP | 2001-016428 A | 1/2001 |
| JP | 2004-072553 A | 3/2004 |
| JP | 2005-045514 A | 2/2005 |
| JP | 2007-079708 A | 3/2007 |

\* cited by examiner

*Primary Examiner* — Jason Whipkey
(74) *Attorney, Agent, or Firm* — Fujitsu Patent Center (57) ABSTRACT

An image processing apparatus for correcting image distortion includes a storage which stores before-correction coordinates in a coordinate system of a before-correction image, corresponding to each pixel in a coordinate system of a corrected image; a coordinate output section which reads from the storage and outputs the before-correction coordinates corresponding to coordinates input to select each pixel of the corrected image; a pixel data output section which outputs the data of the before-correction image, corresponding to the before-correction coordinates, as the data of the pixel of the corrected image, corresponding to the before-correction coordinates; and a pixel data calculator which calculates, when the before-correction coordinates include a value after the decimal point, a weighted average based on the data of a plurality of pixels close to the before-correction coordinates in the before-correction image to output the weighted average as the data of the pixel of the corrected image.

6 Claims, 6 Drawing Sheets

IMAGE PROCESSING APPARATUS, IMAGE CAPTURING APPARATUS, AND IMAGE DISTORTION CORRECTION METHOD

This application is a continuing application, filed under 35 U.S.C. Section 111(a), of International Application PCT/JP2007/059571, filed May 9, 2007.

FIELD

The embodiments discussed herein are related to an image processing apparatus for correcting image distortion, an image capturing apparatus provided with a distortion correction function of the image processing apparatus, and an image distortion correction method.

BACKGROUND

Image capturing apparatuses which can record captured images as digital data, such as digital still cameras and digital video cameras, have been widely spread in recent years. Demands for more compact and more inexpensive digital image capturing apparatuses with a higher-magnification zooming function have been increased. It is known that lenses for the image capturing apparatuses cause optical image distortion due to so-called distortion aberration especially at the wide-angle side. Such distortion tends to become larger when the optical system becomes shorter or the zooming function provide a higher magnification. To manufacture lenses having low distortion, the cost increases.

Such image distortion has been corrected by applying image processing to an image signal obtained from image capturing. It is known that the amount of distortion aberration is proportional to the cube of the distance from the center of the light receiving plane of the image capturing device. A method has been generally used in which the coordinate system of a before-correction image is converted to a coordinate system formed of the image center and the distance therefrom, the positions of the original pixels are shifted by the amount of aberration according to the above-described characteristics, and then the coordinate system is converted to the coordinate system of a corrected image according to the data of the pixels.

However, such a theoretical calculation method needs to frequently use floating-point arithmetic calculations and trigonometric functions, requiring a vast amount of calculation time and high calculation capacity. In addition, spherical lenses have been used increasingly these days, and it is difficult to obtain their aberration characteristics by calculations in a simple manner. In contrast, a method has been proposed in which the after-conversion coordinates depending on the amount of aberration, of each pixel in an image are stored in advance in a read only memory (ROM), and image data after coordinate conversion is written in an image memory, based on the stored information (for example, see Japanese Laid-open Utility Model Application Publication No. 05-48051 (paragraph numbers [0012] to [0013], FIG. 1).

As a conventional technique related to image distortion correction, a distortion correction method has been used, in which, to correct image distortion caused by the projection direction when an image is projected on a screen by a projector, the original image is attached to a polygonal mesh indicating the shape of the screen as texture by using condition parameters at the observer side, the polygonal mesh is drawn by using projection condition parameters at the projector side, and the drawn image is projected (for example, see Japanese Laid-open Patent Publication No. 2004-72553 (paragraph number [0005], FIG. 1).

As another related technique, a digital copying machine has been used in which, to copy an opened book, correction is applied to the read image such that an area where the backbone of the book is located, which has distortion, is enlarged in the sub-scanning direction (for example, see Japanese Laid-open Patent Publication No. 2001-16428 (paragraph numbers [0074] to [0077], FIG. 6).

As described above, to use theoretical calculations to correct image distortion caused by distortion aberration, a vast amount of calculations are necessary. Therefore, when hardware is used to perform the calculations, the circuit scale becomes large. Especially when an spherical lens is used, it is almost impossible to perform the calculations by hardware. When software is used to perform the calculations, a very high calculation capacity is necessary. Therefore, it is difficult to implement such distortion correction calculations in image capturing apparatuses.

As the technique disclosed in Japanese Laid-open Utility Model Application Publication No. 05-48051 (paragraph numbers [0012] to [0013], FIG. 1), when a method is used in which the coordinates of each pixel after conversion are read from the ROM and mapped with the coordinate system of a before-correction image being used as a reference, after coordinate conversion processing is performed in the scanning order of the before-correction image, data calculation processing needs to be executed for each pixel in the scanning order of the corrected image. Therefore, processing efficiency is low and high speed processing is difficult. In addition, if rounding off is used to calculate each pixel of the corrected image after mapping, an area having no data is generated in the image. Therefore, the image correction precision becomes low, and extra calculations are necessary to fill the area.

As the technique disclosed in Japanese Laid-open Utility Model Application Publication No. 05-48051 (paragraph numbers [0012] to [0013], FIG. 1), when the after-conversion coordinates depending on the amount of aberration are stored in advance in a ROM for each pixel, the capacity of the ROM needs to be large, increasing the circuit scale and manufacturing cost.

SUMMARY

According to an aspect of the invention, an image processing apparatus for correcting image distortion includes a storage which stores before-correction coordinates in a coordinate system of a before-correction image, corresponding to each pixel in a coordinate system of a corrected image; a coordinate output section which reads, when coordinates to select each pixel of the corrected image are input, the before-correction coordinates corresponding to the input coordinates, from the storage and output the before-correction coordinates; a pixel data output section which outputs the data of the before-correction image, corresponding to the before-correction coordinates output from the coordinate output section, as the data of the pixel of the corrected image, corresponding to the before-correction coordinates; and a pixel data calculator which calculates, when the before-correction coordinates output from the coordinate output section include a value after the decimal point, a weighted average based on the data of a plurality of pixels close to the before-correction coordinates in the before-correction image to output the weighted average as the data of the pixel of the corrected image, corresponding to the before-correction coordinates.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be explained below with reference to the accompanying drawings, wherein like reference numerals refer to like elements throughout.

Figure 1:
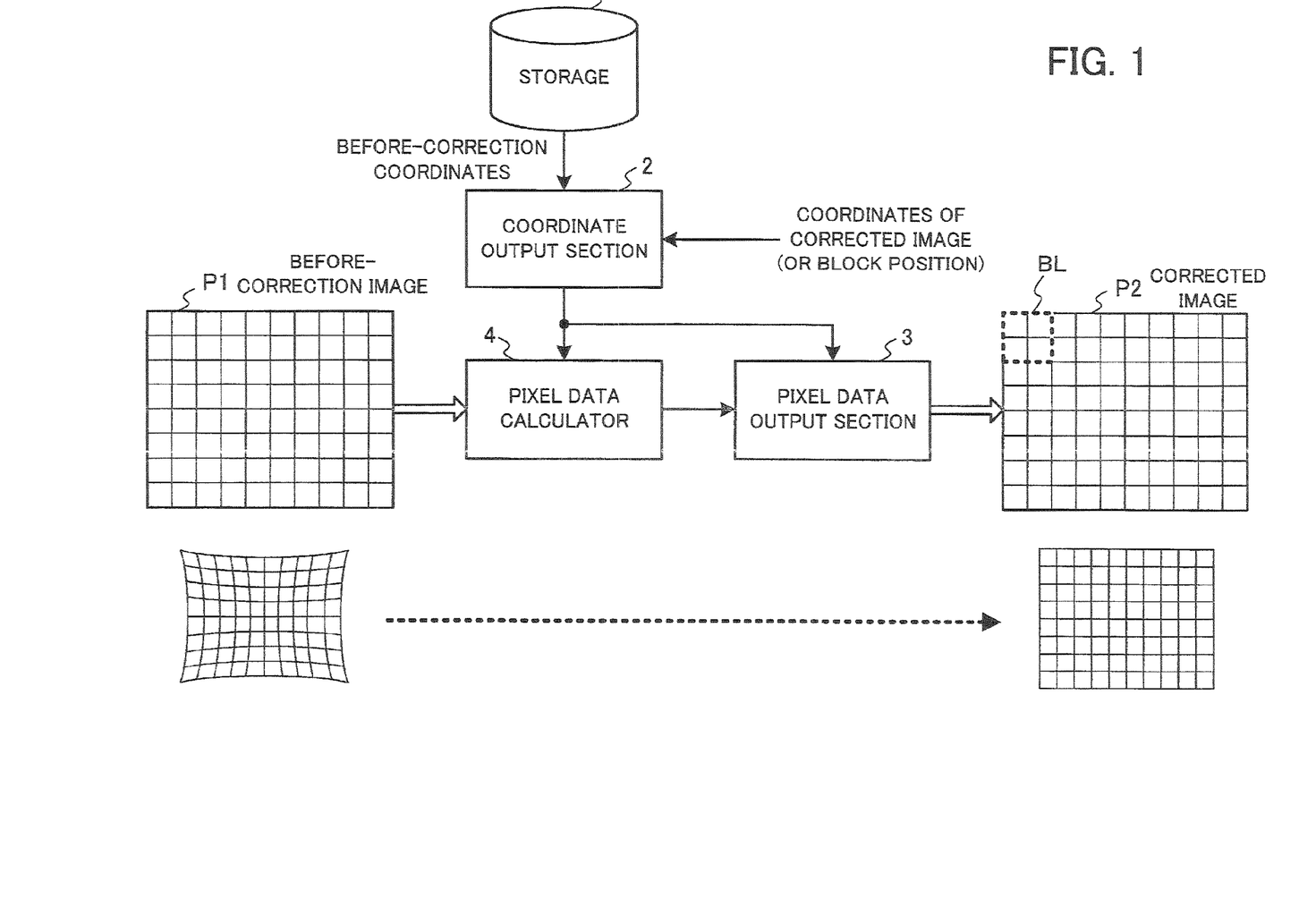
FIG. 1 is a functional block diagram illustrating a main structure of an image processing apparatus according to an embodiment of the present invention.

FIG. 1 is a functional block diagram that illustrates a main structure of an image processing apparatus according to an embodiment of the present invention.

The image processing apparatus illustrated in FIG. 1 receives the data of a before-correction image P1, corrects the distortion of the before-correction image P1 by image processing, and outputs a corrected image P2. Distortion that can be corrected is not particularly limited, but it includes distortion caused by the distortion aberration of an image capturing lens. The image processing apparatus includes a storage 1, a coordinate output section 2, a pixel data output section 3, and a pixel data calculator 4.

The storage 1 stores the before-correction coordinates corresponding to each pixel of the corrected image P2. The before-correction coordinates are the coordinates where each pixel of the corrected image P2 was located in the before-correction image P1 before movement caused by distortion correction, indicated in the coordinate system of the corrected image P2. Therefore, the before-correction coordinates are not necessarily integers depending on the movement caused by the distortion correction and can have a value after the decimal point.

The storage 1 can store any before-correction coordinates depending on distortion characteristics. The before-correction coordinates may be calculated in advance by computation or may be obtained from the data of an image actually taken. The before-correction coordinates may be a vector indicating the movement distance with the coordinates of each pixel of the corrected image P2 being used as a reference.

When coordinates to select each pixel of the corrected image P2 are input, the coordinate output section 2 reads the before-correction coordinates corresponding to the input coordinates, from the storage 1 and outputs them to the pixel data output section 3 and to the pixel data calculator 4.

The pixel data output section 3 outputs the data of the before-correction image P1, corresponding to the before-correction coordinates output from the coordinate output section 2, as the data of the pixel of the corrected image P2, corresponding to the before-correction coordinates. When the before-correction coordinates output from the coordinate output section 2 are integers and those coordinates exist in the before-correction image P1, the data of the pixel at the coordinates is extracted from the before-correction image P1 to output it as the data of the corresponding pixel in the corrected image P2. When the before-correction coordinates output from the coordinate output section 2 include a value after the decimal point, the pixel data output section 3 outputs data calculated by the pixel data calculator 4 as the data of the corresponding pixel in the corrected image P2.

The pixel data calculator 4 extracts from the data of the before-correction image P1 in the coordinate system of the image, the data of plural pixels located close to the before-correction coordinates output from the coordinate output section 2. The pixel data calculator 4 calculates a weighted average of the data of the extracted plural pixels to output it as the data of the pixel of the corrected image P2, corresponding to the before-correction coordinates. The coefficients used in this weighted average operation need to be specified based on the relative positions between the coordinates of the extracted plural pixels in the before-correction image P1 and the before-correction coordinates output from the coordinate output section 2.

With the above-described processing, the coordinates (before-correction coordinates) in the coordinate system of the before-correction image P1, corresponding to each pixel in the coordinate system of the corrected image P2 are stored in the storage 1 in advance, and the before-correction coordinates corresponding to the coordinates of the corrected image P2 are sequentially read. Therefore, coordinate conversion for distortion correction is simplified. In other words, this method can greatly reduce the amount of calculations for distortion correction and can perform the calculations at a higher speed, compared with a method that calculates the correspondence between the coordinates used before and after correction by using a calculation expression which indicates the characteristics of image distortion.

Since the method of the present embodiment maps the data of the before-correction image P1 with the coordinate system of the corrected image P2 being used as a reference, even if the pixel data calculator 4 uses rounding off when calculating the pixel data of the corrected image P2, an area having no data is prevented from being generated in the output image. Therefore, the quality of an image obtained from the pixel data output section 3 is improved. In addition, since there is no need to perform extra calculations to fill the area, processing efficiency is also improved.

Furthermore, in the above-described processing, coordinates are sequentially input to the coordinate output section 2 in the scanning order of the pixels of the corrected image P2 to be output, and the data of the pixels of the corrected image P2 are sequentially output from the pixel data output section 3. Therefore, once the corrected image P1 is stored in a random access memory (RAM) or the like, it is just necessary to execute the processing sequentially in the scanning order of the image to be finally output, that is, the corrected image P2. Image processing control is simplified.

When the coordinates of the corrected image P2, corresponding to each pixel in the coordinate system of the before-correction image P1 are stored in the storage 1 according to a conventional general texture mapping method, for example, coordinate conversion calculation is first performed in the scanning order of the before-correction image P1, and then, interpolation is applied to the data of each pixel in the scanning order of the corrected image P2. Therefore, the processing of the present embodiment increases the efficiency and speed of the image processing.

In the above description, the storage 1 stores the before-correction coordinates corresponding to all the pixels in the corrected image P2. In contrast, the amount of data stored in the storage 1 may be reduced by dividing the coordinate system of the corrected image P2 uniformly into rectangular blocks BLs and by storing only the coordinates (before-correction coordinates) of the before-correction image P1, corresponding to the corners of each of the rectangular blocks BLs in the storage 1.

In that case, when a selection instruction for selecting the position of a rectangular block BL in the corrected image P2, for example, the coordinate output section 2 reads the before-correction coordinates corresponding to the rectangular block BL from the storage 1. Based on the before-correction coordinates corresponding to each of the read corners and the relative position of each pixel in the rectangular block BL of the corrected image P2 with respect to each corner of the rectangular block BL, the coordinates in the before-correction image P1, corresponding to each pixel in the rectangular block BL are calculated. With this operation, the pixel data calculator 4 and the pixel data output section 3 can output the data of each pixel in the corrected image P2.

An embodiment will be described below in which the coordinate system of the corrected image P2 is divided into rectangular blocks as described above. An image capturing apparatus, such as a digital still camera, that employs such a distortion correction method will be taken as an example and described.

Figure 2:
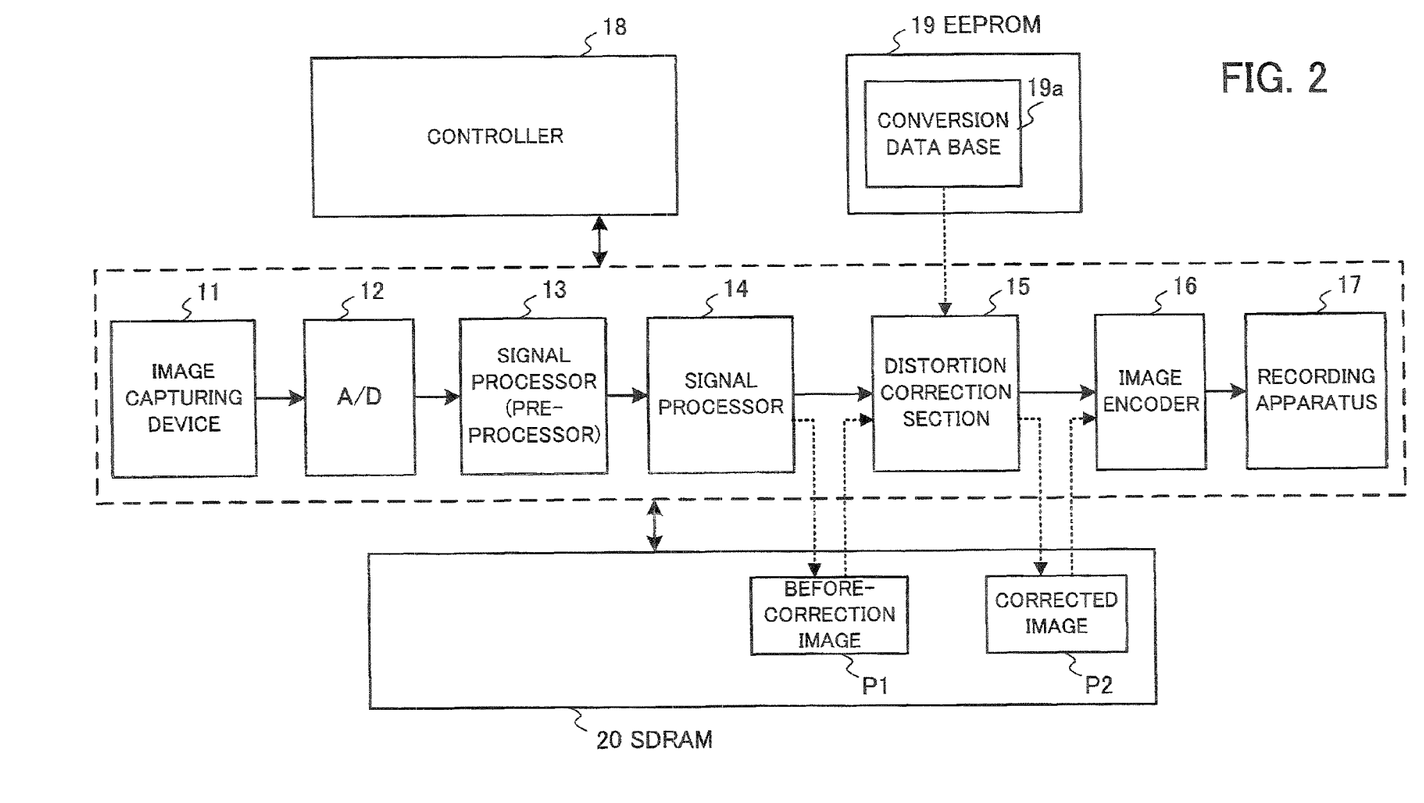
FIG. 2 is a block diagram of an image capturing apparatus according to an embodiment of the present invention.

FIG. 2 is a block diagram of an image capturing apparatus according to an embodiment.

The image capturing apparatus illustrated in FIG. 2 includes an image capturing device 11, an A/D converter 12, signal processors 13 and 14, a distortion correction section 15, an image encoder 16, a recording apparatus 17, a controller 18, an electrically erasable programmable ROM (EEPROM) 19, and a synchronous dynamic RAM (SDRAM) 20.

The image capturing device 11 is a solid image capturing device of a charge coupled device (CCD) type, a complementary metal oxide semiconductor (CMOS) type, or other types, and converts light incident through an optical block, not shown, into an electrical signal. An image signal is output from the image capturing device 11, is converted to digital data through sample and hold by the A/D converter 12, and is sent to the signal processor 13.

The signal processor 13 executes a so-called pre-process in which various detection processing is applied to the image data output from the A/D converter 12 to send the result of detection to the controller 18. Under the control of the controller 18, the signal processor 13 also applies noise removal, white balance adjustment, and other processing to the image data output from the A/D converter 12. The signal processor 14 applies color interpolation to the image data output from the signal processor 13, which is disposed immediately therebefore, to generate red, green, and blue (RGB) image data having a predetermined number of pixels, and further applies various signal processing such as noise removal.

The distortion correction section 15 applies distortion correction to the image data output from the signal processor 14 by referencing a conversion data base 19a that stores the coordinates in the before-correction image P1, corresponding to each corner of the rectangular blocks in the corrected image P2.

The image data which has been subjected to the distortion correction is sent to the image encoder 16 and is subjected to compression encoding according to a predetermined still image data format, such as Joint Photographic Coding Experts Group (JPEG) encoding. The image file generated by encoding is recorded in a recording medium by the recording apparatus 17. Recording media handled by the recording apparatus 17 include, for example, detachable recording media such as a flash memory card and an optical disc, and fixed-type recording media such as a hard disk drive (HDD).

The controller 18 is a microcontroller formed of a central processing unit (CPU) and executes a program stored in the EEPROM 19 to control each unit of the image capturing apparatus collectively. The EEPROM 19 stores in advance the program executed by the controller 18, the conversion data base 19a, which is referenced by the distortion correction section 15, and other data necessary for the processing of each unit of the image capturing apparatus. To perform such functions, various non-volatile memories such as a flash memory can be used instead of the EEPROM 19.

The SDRAM 20 is a memory used as a working area for the processing of each unit of the image capturing apparatus, and mainly stores image data which is being signal-processed, temporarily. For example, the data of the before-correction image P1 output from the signal processor 14 is temporarily stored in the SDRAM 20, and only necessary parts thereof are sequentially read by the distortion correction section 15. A distortion-corrected image (corrected image P2) is also stored in the SDRAM 20.

Figure 3:
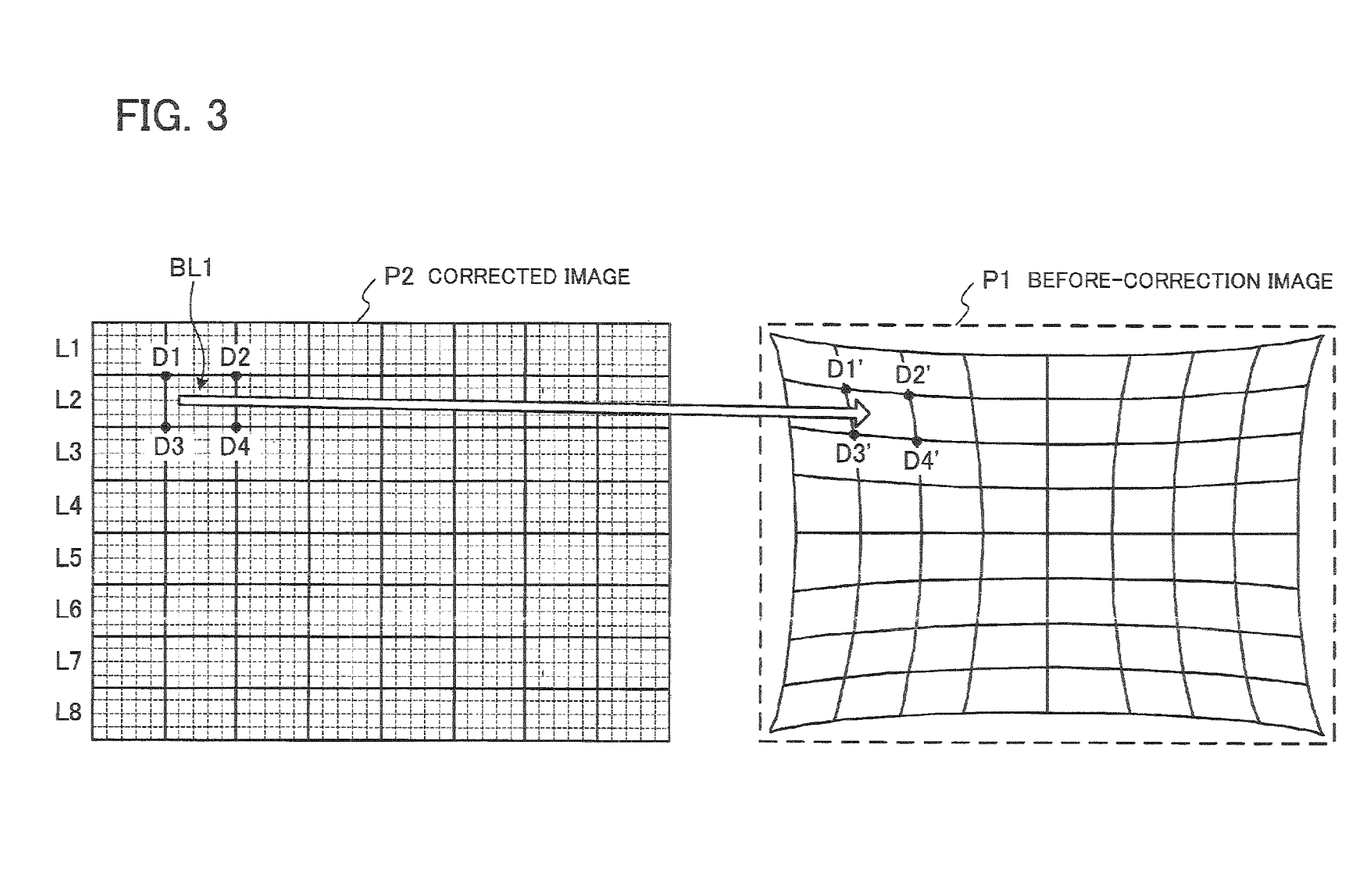
FIG. 3 illustrates rectangular blocks used as references for storage information in a conversion data base.

FIG. 3 illustrates rectangular blocks used as references for storage information in the conversion data base 19a.

The conversion data base 19a stores the coordinates in the before-correction image P1, corresponding to each corner of each of rectangular blocks generated by uniformly dividing the coordinate system of the corrected image P2. FIG. 3 illustrates an example in which distortion caused by pincushion distortion aberration is corrected. The coordinate system of the corrected image P2 are divided by eight in the horizontal and vertical directions to define rectangular blocks each having five pixels horizontally and four pixels vertically.

Assuming that the corners D1 to D4 of a rectangular block BL1 in the corrected image P2 were located at the corners D1' to D4' in the before-correction image P1 before distortion correction, the conversion data base 19a stores the coordinates of the corners D1' to D4' in the coordinate system of the before-correction image P1, as the coordinates corresponding to the rectangular block BL1.

Such relationships between coordinates in corrected image P2 and coordinates in the before-correction image P1 can be obtained by measuring in advance an image actually captured. The conversion data base 19a may store the coordinates corresponding to the four corners of only the rectangular block first scanned (that is, the upper-and-left-most block) in the corrected image P2 and the coordinates corresponding to three corners other than the upper-and-left-most corner of each of the other rectangular blocks. Alternatively, the conversion data base 19a may store the coordinates corresponding to two corners located horizontally and vertically with respect to the upper-and-left-most corner of each of the blocks other than the upper-and-left-most rectangular block.

The conversion data base 19a may store, instead of the coordinates corresponding to each corner, a vector indicating the movement distance from the coordinates in the corrected image P2 to the coordinates in the before-correction image P1. With this operation, the number of orders in binary data to be stored is reduced, further reducing the necessary storage capacity.

Figure 4A:
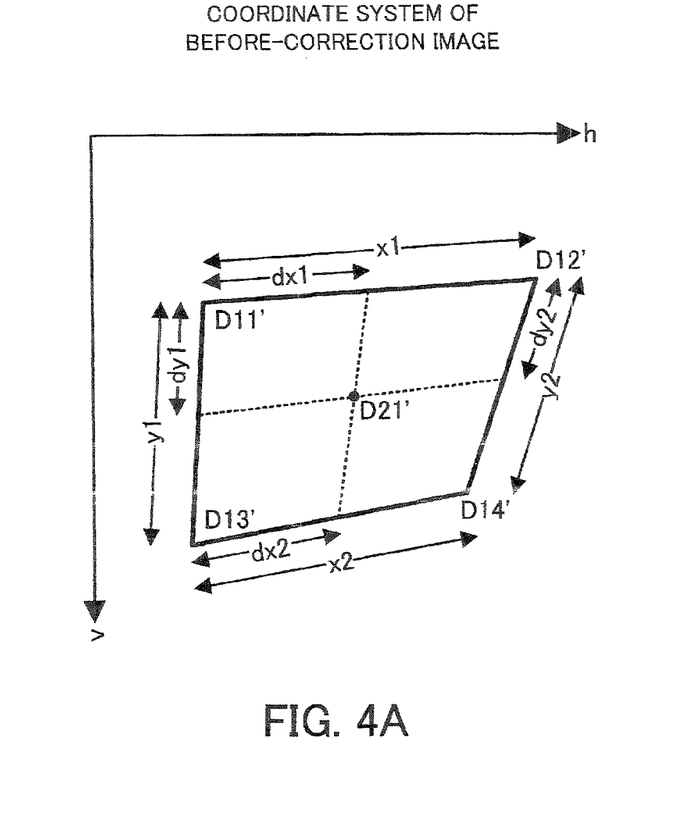
FIGS. 4A and 4B illustrate how the coordinates in a before-correction image, corresponding to each pixel in a rectangular block are calculated.
Figure 4B:
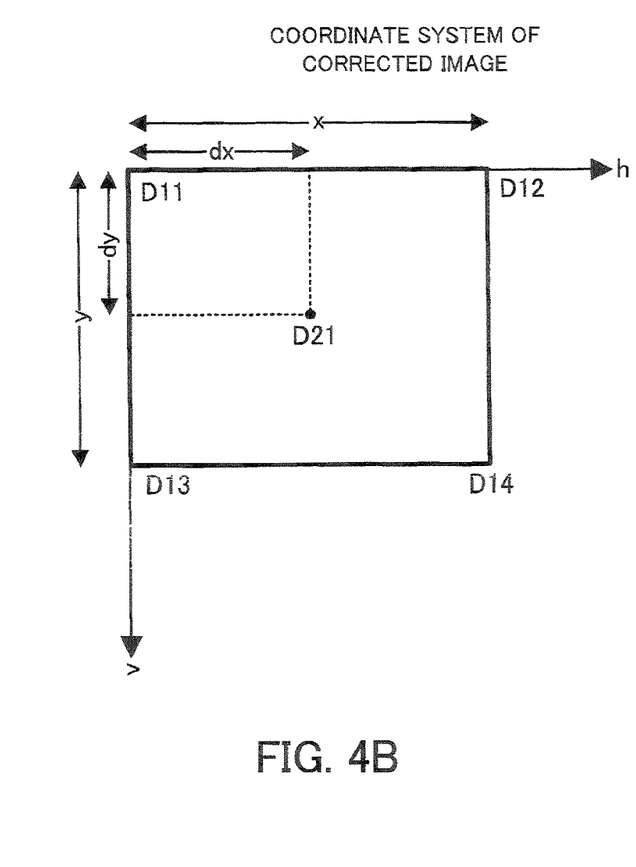

Processing performed in the distortion correction section 15 will be described below in detail. FIG. 4A and FIG. 4B illustrate how the coordinates in the before-correction image, corresponding to each pixel in a rectangular block are calculated.

Receiving a selection instruction for selecting each rectangular block in the corrected image P2 from the controller 18, the distortion correction section 15 reads the coordinates corresponding to the specified rectangular block from the conversion data base 19a. Then, the distortion correction section 15 maps the data of the before-correction image P1, corresponding to the read coordinates to the corresponding pixels in the rectangular block of the corrected image P2. The coordinates in the before-correction image P1, corresponding to pixels other than the corners of the specified rectangular block are calculated based on the relative positions of the pixels with respect to the corners of the rectangular block.

It is assumed in FIGS. 4A and 4B, for example, that the conversion data base 19a has stored the coordinates of corners D11' to D14' in the before-correction image P1, corresponding to corners D11 to D14 of a rectangular block in the corrected image P2. In this rectangular block, which has a distance "x" between the corners D11 and D12 and a distance "y" between the corners D11 and D13, a pixel D21 located a distance "dx" horizontally and a distance "dy" vertically with respect to the corner D11 is taken as an example, where the following conditions are satisfied.

$$0<dx<x$$

$$0<dy<y$$

In this case, the coordinates of a point D21' in the before-correction image P1, corresponding to the pixel D21 satisfy the following conditions and are calculated, where the coordinates of the corners D11' to D13' are used.

$$dx/x=dx1/x1$$

$$dy/y=dy1/y1$$

$$0<dx1<x1$$

$$0<dy1<y1$$

Alternately, more precisely, the coordinates satisfy the following conditions and are calculated, where the coordinates of the corners D11' to D14' are used.

$$dx/x=dx1/x1=dx2/x2$$

$$dy/y=dy1/y1=dy2/y2$$

$$0<dx2<x2$$

$$0<dy2<y2$$

If the calculated coordinates have a value after the decimal point, data corresponding to the coordinates are calculated by applying bilinear interpolation with the use of the data of pixels located close to the calculated coordinates in the before-correction image P1, as will be described below.

Figure 5:
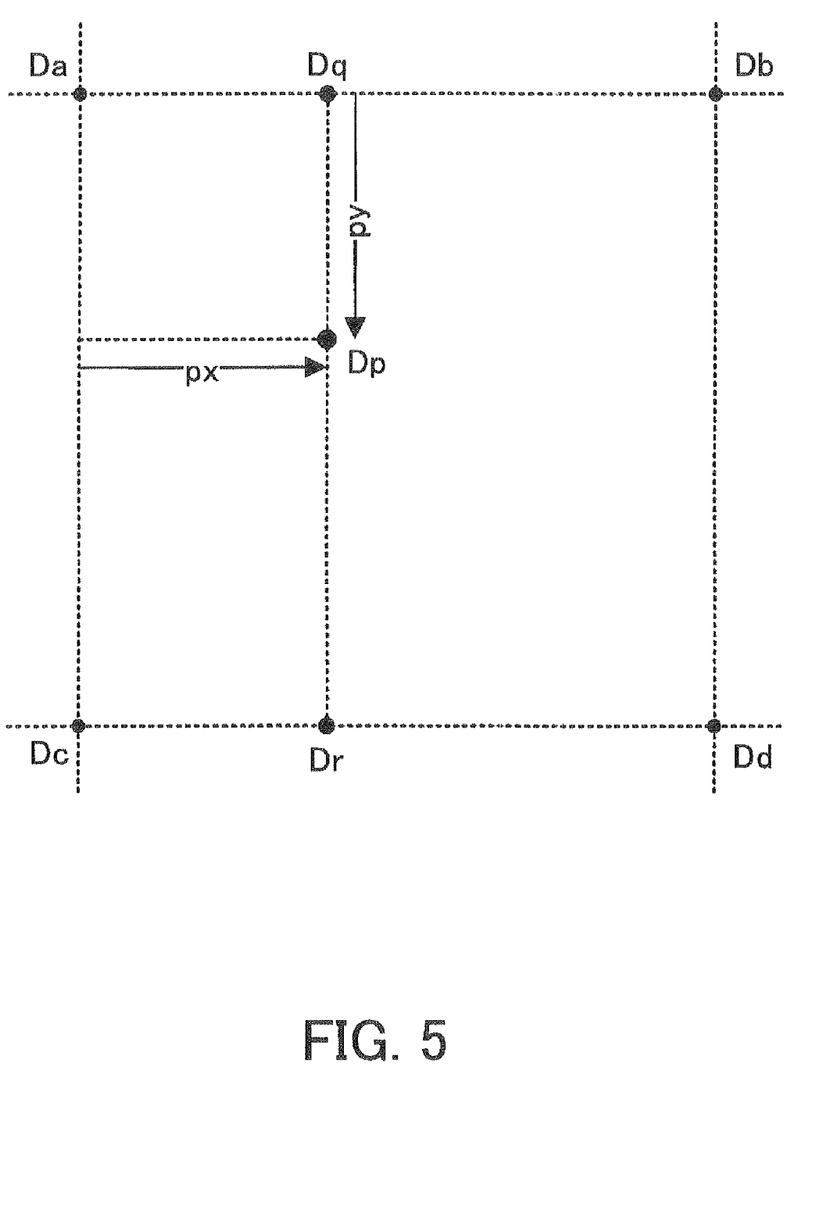
FIG. 5 illustrates an example of interpolation of data at coordinates having a value after the decimal point.

FIG. 5 illustrates how interpolation is applied to data at coordinates having a value after the decimal point.

In FIG. 5, it is assumed that four adjacent points (pixels) Da, Db, Dc, and Dd are located in the coordinate system of the before-correction image P1 and the points have pixel data A, B, C, and D. It is also assumed that the coordinates corresponding to the position of a point Dp located inside the four points are calculated by the calculations, described above, of the coordinates (before-correction coordinates) in the before-correction image P1. The data of the point Dp will be calculated as described below.

The values after the decimal points of the calculated coordinates of the point Dp are called px and py, and the points obtained by moving the points Da and Dc horizontally by px are called points Dq and Dr. Then, the data Q and R of the points Dq and Dr are obtained from the following expressions (1) and (2).

$$Q=(1-px)\times A+px\times B \quad (1)$$

$$R=(1-px)\times C+px\times D \quad (2)$$

From the values of Q and R, the data P of the point Dp is obtained from the following expression (3).

$$P = (1 - py) \times Q + py \times R = \\ px \times py \times (A - B - C + D) + px \times (B - A) + py \times (C - A) + A \quad (3)$$

In the example illustrated in FIG. 5, interpolation is performed based on the data of the four pixels in the before-correction image P1, adjacent to the positions of the before-correction coordinates. Interpolation may be performed by using the data of a greater number of a plurality of adjacent pixels.

Figure 6:
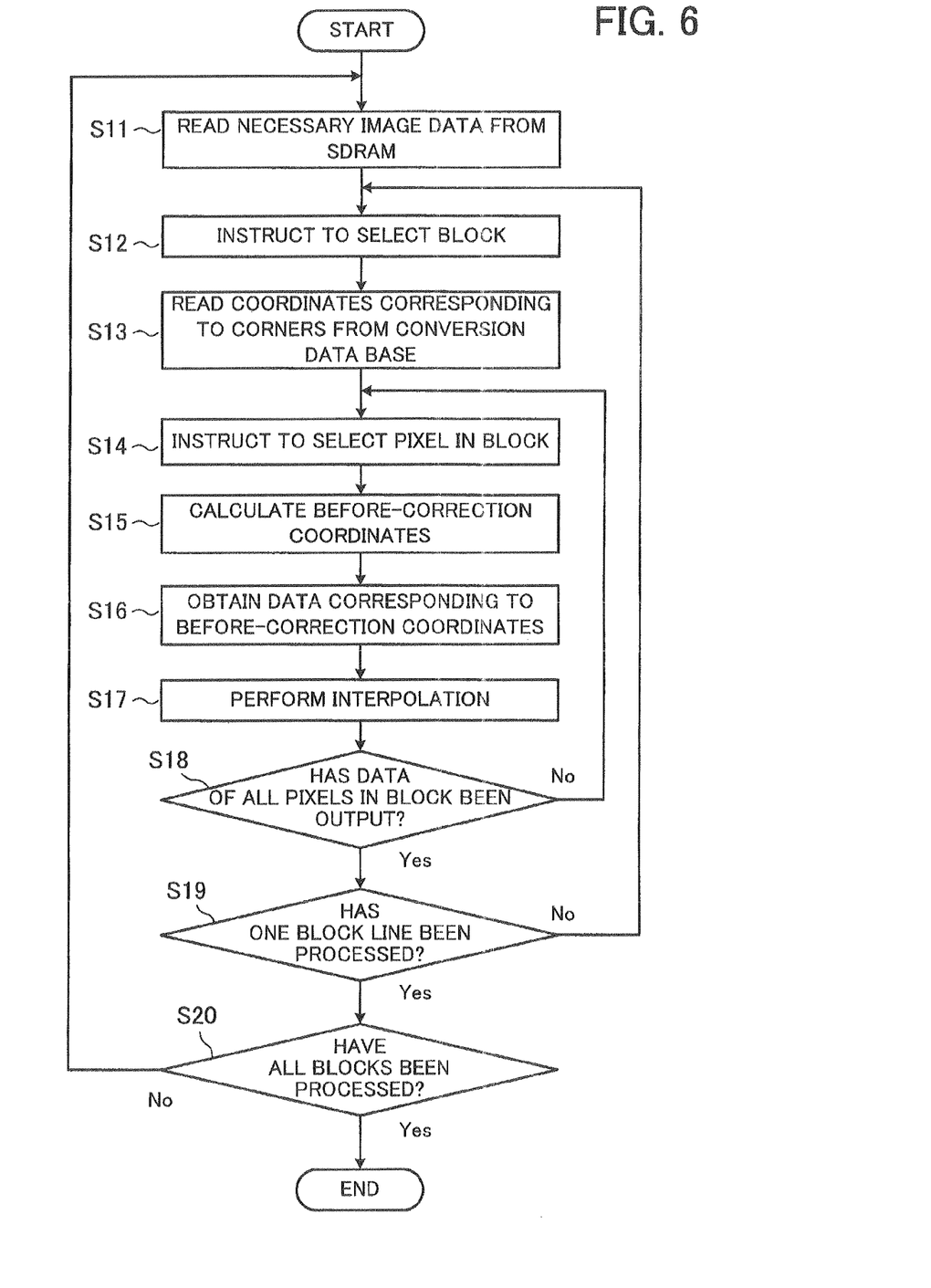
FIG. 6 is a flowchart indicating an example flow of distortion correction for one screen.

FIG. 6 is a flowchart illustrating an example flow of one-screen distortion correction.

In the processing of FIG. 6, rectangular blocks are sequentially selected horizontally from the upper left in the coordinate system of the corrected image P2. A plurality of horizontally adjacent rectangular blocks is called a block line. For example, L1 to L8 in FIG. 3 indicate the numbers of block lines.

Step S11: The distortion correction section 15 reads the data of pixels necessary for the processing among the data of the before-correction image P1, from the SDRAM 20. When the maximum movement distance of the coordinates between the before-correction image P1 and the corrected image P2 in one block line is known in advance, the data of the number of block lines corresponding to the vertical component of the maximum movement distance is read from the SDRAM 20, allowing the processing of the one block line to be executed.

As an example, the vertical length of each rectangular block is set to the vertical component of the maximum movement distance between corresponding coordinates in the before-correction image and corrected image. Therefore, the process of step S11 is called every time one block line is processed. In step S11, the data of pixels in up to two block lines in the before-correction image P1 is read from the SDRAM 20. For example, the process may be performed such that the data of pixels in two block lines is read only in the first execution and the data of pixels in the following one block line is read in each of the subsequent executions.

The data read from the SDRAM 20 is stored in a line memory provided for the distortion correction section 15. The line memory may be provided in the SDRAM 20.

Step S12: The distortion correction section 15 receives a selection instruction for selecting one rectangular block, from the controller 18.

Step S13: The distortion correction section 15 reads the coordinates corresponding to the corners of the specified rectangular block, from the conversion data base 19a.

Step S14: The distortion correction section 15 receives a selection instruction for selecting one pixel in the rectangular block in the coordinate system of the corrected image P2, from the controller 18.

Step S15: Based on the coordinates read in step S13, the distortion correction section 15 calculates the coordinates (before-correction coordinates) in the coordinate system of the before-correction image P1, corresponding to the pixel specified in step S14, by linear interpolation. An example of interpolation has been described with reference to FIGS. 4A and 4B.

Step S16: The distortion correction section 15 obtains the data of the pixel of the before-correction image P1, corresponding to the before-correction coordinates calculated in step S15 (that is, the data of a plurality of pixels in the before-correction image P1, adjacent to the position of the before-correction coordinates), from the data read in step S11.

Step S17: Based on the data obtained in step S16, the distortion correction section 15 performs bilinear interpolation. The distortion correction section 15 writes the calculated data in the SDRAM 20 as the data of the pixel specified in step S14 in the corrected image P2.

Step S18: The distortion correction section 15 (or the controller 18) determines whether the data of all pixels in the one rectangular block has been output. If not, the processing returns to step S14 and the next pixel in the rectangular block is selected. When the data of all the pixels in the rectangular block has been output, the processing proceeds to step S19.

Step S19: The distortion correction section 15 (or the controller 18) determines whether the one block line has been processed. If not, the processing returns to step S12 and the next rectangular block in the block line is selected. When the one block line has been processed, the processing proceeds to step S20.

Step S20: The distortion correction section 15 (or the controller 18) determines whether all rectangular blocks in the coordinate system of the corrected image P2 have been processed. If not, the processing returns to step S11 and data necessary for the next block line processing is read from the SDRAM 20. When all the rectangular blocks have been processed, it means that one screen has been processed.

With the above-described processing, a block line in the corrected image P2 is used as a processing unit and the vertical length of each rectangular block is set to the vertical component of the maximum movement distance between corresponding coordinates of the before-correction image and the corrected image. Therefore, the data of the before-correction image P1 is read from the SDRAM 20 efficiently, reducing the processing load of the overall system to increase the processing speed. The distortion correction is suitable to increase the processing efficiency especially when the amount of distortion changes depending on the distance from a predetermined position in an image, as in barrel or pincushion distortion.

The above-described distortion correction function can be implemented by a computer. In that case, a program that describes the processing details of the function which the image processing apparatus and the image capturing apparatus need to have is provided. When the computer executes the program, the function is implemented in the computer. The program describing the processing details can be recorded in computer-readable recording media. The computer-readable recording media include magnetic recording apparatuses, optical discs, magneto-optical recording media, and semiconductor memories.

To distribute the program, portable recording media having recorded the program, such as optical discs, are sold, for example. The program can be stored in a storage apparatus of a server computer and transferred to another computer through a network from the server computer.

The computer that executes the program stores the program recorded in a portable recording medium or transferred from the server computer, in a storage apparatus of the computer. Then, the computer reads the program from the storage apparatus and executes the processing according to the program. The computer can read the program directly from the portable recording medium and executes the processing according to the program. Every time the program is transferred from the server computer, the computer can execute processes according to the received program.

According to the image processing apparatus of the present embodiment, since the coordinates in the coordinate system of the before-correction image, corresponding to each pixel in the coordinate system of the corrected image are stored in the storage, the coordinate conversion process for distortion correction can be simplified. In addition, since the data of each pixel of the corrected image can be output in the scanning order, image distortion can be corrected precisely with the highly efficient processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. An image processing apparatus for correcting image distortion, comprising:
    a storage configured to store before-correction coordinates in a coordinate system of a before-correction image, corresponding to each pixel in a coordinate system of a corrected image;
    a coordinate output section configured, when coordinates to select each pixel of the corrected image are input, to read the before-correction coordinates corresponding to the input coordinates, from the storage and output the before-correction coordinates;
    a pixel data output section configured to output the data of the before-correction image, corresponding to the before-correction coordinates output from the coordinate output section, as the data of the pixel of the corrected image, corresponding to the before-correction coordinates; and
    a pixel data calculator configured, when the before-correction coordinates output from the coordinate output section include a value after the decimal point, to calculate a weighted average based on the data of a plurality of pixels close to the before-correction coordinates in the before-correction image to output the weighted average as the data of the pixel of the corrected image, corresponding to the before-correction coordinates:
    wherein the storage stores only before-correction coordinates corresponding to corners of each of rectangular blocks generated by uniformly dividing the coordinate system of the corrected image; and
    the coordinate output section includes,
        a coordinate reading section configured, when receiving an instruction to select one of the rectangular blocks in the corrected image, to read before-correction coordinates corresponding to the selected rectangular block, from the storage, and
        a coordinate calculator configured to calculate before-correction coordinates corresponding to each pixel in the rectangular block, based on the before-correction coordinates corresponding to the rectangular block, read by the coordinate reading section and a relative position of each pixel in the rectangular block in the corrected image with respect to each corner of the rectangular block, and to output the before-correction coordinates corresponding to each pixel to the pixel data output section and to the pixel data calculator.

2. The image processing apparatus according to claim 1, wherein the storage stores the before-correction coordinates in the before-correction image as a vector using corresponding coordinates in the corrected image as a reference.

3. The image processing apparatus according to claim 1, wherein the coordinate calculator calculates the before-correction coordinates of each pixel in the rectangular block by applying linear interpolation to the before-correction coordinates corresponding to the rectangular block in the storage, based on a relative position of a corresponding pixel in the rectangular block in the corrected image with respect to each corner of the rectangular block.

4. The image processing apparatus according to claim 1, wherein, when the vertical length of the rectangular blocks is set to the vertical maximum movement distance between the coordinates of each pixel in the corrected image and the before-correction coordinates corresponding thereto in the before-correction image, and the coordinate reading section receives a selection instruction for sequentially selecting some of the rectangular blocks horizontally in the corrected image,
  if the coordinate reading section receives a selection instruction for selecting the rectangular block located at the top of one block line formed of all rectangular blocks adjacent horizontally,
  the pixel data calculator reads the data of up to two block lines that includes the rectangular block selected by the coordinate reading section, from the data of the before-correction image and executes data calculation.

5. An image capturing apparatus provided with a function which corrects captured-image distortion, comprising:
  a storage configured to store before-correction coordinates in a coordinate system of a before-correction image, corresponding to each pixel in a coordinate system of a corrected image;
  a coordinate output section configured, when coordinates to select each pixel of the corrected image are input, to read the before-correction coordinates corresponding to the input coordinates, from the storage and output the before-correction coordinates;
  a pixel data output section configured to output the data of the before-correction image, corresponding to the before-correction coordinates output from the coordinate output section, as the data of the pixel of the corrected image, corresponding to the before-correction coordinates; and
  a pixel data calculator configured, when the before-correction coordinates output from the coordinate output section include a value after the decimal point, to calculate a weighted average based on the data of a plurality of pixels close to the before-correction coordinates in the before-correction image to output the weighted average as the data of the pixel of the corrected image, corresponding to the before-correction coordinates:
  wherein the storage stores only before-correction coordinates corresponding to corners of each of rectangular blocks generated by uniformly dividing the coordinate system of the corrected image; and
  the coordinate output section includes,
    a coordinate reading section configured, when receiving an instruction to select one of the rectangular blocks in the corrected image, to read before-correction coordinates corresponding to the selected rectangular block, from the storage, and
    a coordinate calculator configured to calculate before-correction coordinates corresponding to each pixel in the rectangular block, based on the before-correction coordinates corresponding to the rectangular block, read by the coordinate reading section and a relative position of each pixel in the rectangular block in the corrected image with respect to each corner of the rectangular block, and to output the before-correction coordinates corresponding to each pixel to the pixel data output section and to the pixel data calculator.

6. An image distortion correction method for correcting image distortion caused by the distortion aberration of an image capturing lens, the method comprising:
  when coordinates to select each pixel of a corrected image are input, reading from a storage which stores before-correction coordinates in a coordinate system of a before-correction image, corresponding to each pixel in a coordinate system of the corrected image and outputting before-correction coordinates corresponding to the input coordinates, in a coordinate output section;
  outputting the data of the before-correction image, corresponding to the before-correction coordinates output from the coordinate output section, as the data of the pixel of the corrected image, corresponding to the before-correction coordinates, in a pixel data output section; and
  when the before-correction coordinates output from the coordinate output section include a value after the decimal point, calculating a weighted average based on the data of a plurality of pixels close to the before-correction coordinates in the before-correction image to output the weighted average as the data of the pixel of the corrected image, corresponding to the before-correction coordinates, in a pixel data calculator:
  wherein the storage stores only before-correction coordinates corresponding to corners of each of rectangular blocks generated by uniformly dividing the coordinate system of the corrected image; and
  the reading includes,
    when receiving an instruction to select one of the rectangular blocks in the corrected image, reading before-correction coordinates corresponding to the selected rectangular block, from the storage, and
    calculating before-correction coordinates corresponding to each pixel in the rectangular block, based on the before-correction coordinates corresponding to the rectangular block, read from the storage and a relative position of each pixel in the rectangular block in the corrected image with respect to each corner of the rectangular block, and outputting the before-correction coordinates corresponding to each pixel.

* * * * *